Patented Jan. 9, 1923.

1,441,655

UNITED STATES PATENT OFFICE.

JAMES BADDILEY, JOSEPH BARON PAYMAN, AND HARRY WIGNALL, OF MANCHESTER, ENGLAND, ASSIGNORS TO BRITISH DYESTUFFS CORPORATION LIMITED, OF MANCHESTER, ENGLAND.

MANUFACTURE OF ORTHOSULPHONIC ACIDS OF AROMATIC AMINES.

No Drawing.   Application filed September 23, 1921.   Serial No. 503,911.

*To all whom it may concern:*

Be it known that we, JAMES BADDILEY, JOSEPH BARON PAYMAN, and HARRY WIGNALL, residing at Blackley, Manchester, England, subjects of the King of Great Britain and Ireland, have invented certain new and useful Improvements in or Relating to the Manufacture of Orthosulphonic Acids of Aromatic Amines, of which the following is a specification.

The present invention relates to the sulphonation of aromatic amines for the production of sulphonic acids containing the amino and the sulphonic groups in the ortho position to one another.

In general the known methods of sulphonation of aromatic amines result in the formation of a mixture of isomers and in many cases considerable destruction of organic material results as well. In particular the production of ortho-sulpho amino bodies is attended with difficulty. Thus in the sulphonation of aniline it is difficult to avoid charring and oversulphonation when the operation is carried out with an excess of vitriol and although these disadvantages are reduced to a minimum by the more usual process of "baking" the acid sulphate of aniline, the resulting product is the para-sulphonic acid and not the desired ortho-isomer. The latter acid has in fact only been obtained hitherto by indirect methods so that it was practically out of question as a dyestuff component.

By the process of our invention, it is possible to produce easily the ortho-sulphonic acid of the aniline and other primary aromatic amines in a simple and economical manner.

The production of an ortho-sulpho-amine from *p*-toluidine may be taken as another instance. Here the fact that the para position is occupied would lead one to expect that known methods would give simply the ortho-sulpho amine, but this is not so. The process of baking the acid sulphate gives both the $CH_3:SO_3H:NH_2$ 1.3.4 and 1.2.4. isomers and purification of the desired 1.3.4. isomer leaves much to be desired in economy of manufacture. Our process on the other hand gives directly the desired para-toluidine-meta-sulphonic-acid (1.3.4).

Our method consists in treating the aromatic amines with chlor-sulphonic acid in the presence of a suitable solvent; to be suitable for this purpose the solvent must remain unattacked by chlor-sulphonic acid and its boiling point must be sufficiently high to permit the completion of the sulphonation by heating. The solvent we prefer is tetrachlorethane, though any other suitable solvent may be used.

In some cases the reaction proceeds in two separate stages. In the first, the amine combines with the chlor-sulphonic acid without the evolution of hydrochloric acid. Presumably a chlor-sulphate is obtained. Sometimes this chlor-sulphate separates out as a precipitate from the solvent, and can be collected by filtration and treated further in the absence of the solvent if desired. The second step consists in the conversion of the compound first formed into the sulpho acid with the elimination of hydrochloric acid.

In some cases the two steps take place simultaneously, that is to say, hydrochloric acid begins to come off directly the amine and the chlor-sulphonic acid are mixed with one another.

The following examples will serve to further illustrate the nature of the invention. The parts are by weight:

*Example I.*—121 grammes of α.m-xylidine are dissolved in 500 grammes tetrachlorethane and 122 grammes chlor-sulphonic acid are added with good agitation. Some evolution of hydrochloric acid gas occurs and the temperature is allowed to rise to 80° C. The temperature is then gradually raised to the boiling point and boiling under reflux is continued until hydrochloric acid gas ceases to be evolved.

After cooling the α.m-xylidine-5-sulphonic acid is extracted from the reaction mixture by lixiviation with water containing sufficient soda to form the sodium salt. After separating from tetrachlorethane the solution of the sulphonic acid thus obtained may be used directly, or the free acid may be isolated by precipitation with hydrochloric acid.

*Example II.*—143 grammes of β-naphthylamine are dissolved in 700 grammes of tetrachlorethane and there is then slowly added 120 grammes of chlor-sulphonic acid, the temperature being kept at about 20° C. The mixture is allowed to stir cold for a further period of about 6 hours and then gradually heated to the boiling point of the solvent. After three hours at this temperature, the reaction is complete. The product is then cooled, somewhat diluted with water, and made slightly alkaline with caustic soda. The solvent is then distilled off in steam or otherwise separated and the aqueous residue filtered from unchanged β-naphthylamine.

From the filtrate which contains 2-naphthylamine-1-sulphonic acid in solution as its sodium salt, the free acid may be isolated by precipitation with hydrochloric acid and further purified if desired. For the preparation of azo dyes such as lithol red in the usual way the aqueous solution obtained as above is generally sufficiently pure.

The following are further instances of aromatic amines that can be converted into their ortho acids by treatment with chlor-sulphonic acid in accordance with the present invention—aniline, p-toludine, o-xylidine, m-xylidine, p-nitraniline, p-chloraniline, 3.5-dichlor-1-aniline, 2.4-dichlor-1-aniline, 3.4-dichlor-1-aniline, o-chlor-p-toluidine, depydro-thiotoluidine, ortho-anisidine, chloro-o-anisidine, β-naphthylamine.

What we claim and desire to secure by Letters Patent is:—

1. The manufacture of sulpho acids of aromatic amines by treating the aromatic amine with chlor-sulphonic acid in the presence of a suitable solvent and subsequently heating the product until the sulphonation is complete.

2. The manufacture of sulpho acids of aromatic amines, by treating the aromatic amines with chlor-sulphonic acid in the presence of tetrachlorethane and subsequently heating the product until the sulphonation is completed.

3. The manufacture of an ortho-sulpho-acid of β-naphthylamine by treating β-naphthylamine with chlorsulphonic acid in the presence of tetrachlorethane and subsequently heating the product until the sulphonation is completed.

4. The manufacture of 2-naphthylamine-1-sulphonic-acid by treating β-naphthylamine with chlor-sulphonic acid at approximately normal temperature in the presence of tetra-chlor-ethane, stirring cold and heating to the boiling point of the solvent, diluting, rendering the resulting mixture alkaline, separating the solvent, filtering from unchanged β-naphthylamine and isolating the free acid from the filtrate.

5. The manufacture of 2-naphthylamine 1-sulphonic-acid by treating β-naphthylamine with chlorsulphonic acid at approximately normal temperature in the presence of tetra-chlor-ethane, stirring cold and heating to the boiling point of the solvent, diluting, rendering the resulting mixture alkaline, separating the solvent, filtering from unchanged β-naphthylamine and isolating the free acid from the filtrate by precipitation with hydrochloric acid.

6. The manufacture of 2-naphthylamine-1-sulphonic-acid by treating β-naphthylamine with chlorsulphonic acid at 20° C. in the presence of tetra-chlor-ethane and stirring cold for 6 hours, gradually heating to the boiling point of the solvent, maintaining at the latter temperature for three hours, cooling, diluting somewhat with water, making the resulting mixture slightly alkaline with caustic soda distilling the solvent in steam, filtering from unchanged β-naphthylamine and isolating the free acid from the filtrate by precipitation with hydrochloric acid.

In testimony whereof we have signed our names to this specification.

JAMES BADDILEY.
JOSEPH BARON PAYMAN.
HARRY WIGNALL.